(12) United States Patent
Ryu et al.

(10) Patent No.: US 10,128,988 B2
(45) Date of Patent: Nov. 13, 2018

(54) METHOD AND APPARATUS FOR REPORTING INFORMATION ABOUT TRANSMISSION FAILURE FRAME

(71) Applicant: LG ELECTRONICS INC., Seoul (KR)

(72) Inventors: Kiseon Ryu, Seoul (KR); Suhwook Kim, Seoul (KR); Hangyu Cho, Seoul (KR); Jeongki Kim, Seoul (KR); Giwon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 14/912,862

(22) PCT Filed: Apr. 29, 2014

(86) PCT No.: PCT/KR2014/003789
§ 371 (c)(1),
(2) Date: Feb. 18, 2016

(87) PCT Pub. No.: WO2015/030339
PCT Pub. Date: Mar. 5, 2015

(65) Prior Publication Data
US 2016/0197705 A1    Jul. 7, 2016

Related U.S. Application Data

(60) Provisional application No. 61/871,321, filed on Aug. 29, 2013.

(51) Int. Cl.
*H04L 1/18* (2006.01)
*H04L 5/00* (2006.01)
*H04W 84/12* (2009.01)

(52) U.S. Cl.
CPC .............. *H04L 1/1854* (2013.01); *H04L 1/18* (2013.01); *H04L 5/0055* (2013.01); *H04W 84/12* (2013.01)

(58) Field of Classification Search
None
See application file for complete search history.

(56) References Cited

U.S. PATENT DOCUMENTS

| 2003/0012163 A1* | 1/2003 | Cafarelli | H04L 1/1607 370/338 |
| 2005/0276276 A1* | 12/2005 | Davis | H04L 41/26 370/447 |
| 2014/0269631 A1* | 9/2014 | Jafarian | H04W 74/0816 370/336 |

FOREIGN PATENT DOCUMENTS

| KR | 10-2004-0100537 | 12/2004 |
| KR | 10-2005-0098372 | 10/2005 |

(Continued)

OTHER PUBLICATIONS

PCT International Application No. PCT/KR2014/003789, Written Opinion of the International Searching Authority dated Jul. 28, 2014, 1 page.

*Primary Examiner* — Steven H Nguyen
(74) *Attorney, Agent, or Firm* — Lee, Hong, Degerman, Kang & Waimey

(57) ABSTRACT

Disclosed are a method and an apparatus for reporting information about a transmission failure frame. The method for reporting information about a transmission failure frame in a wireless LAN may comprise the steps of: creating, by an STA, the retransmission frame includes information about the transmission failure frame, the information about the transmission failure frame includes timestamp information and duration information, the timestamp information includes information about the transmission start time of the transmission failure frame, and the duration information includes information about the transmission period of the transmission failure frame.

4 Claims, 13 Drawing Sheets

(56) References Cited

FOREIGN PATENT DOCUMENTS

| | | |
|---|---|---|
| KR | 10-2006-0126409 | 12/2006 |
| KR | 10-2007-0051632 | 5/2007 |
| WO | 11/102575 | 8/2011 |

* cited by examiner

FIG. 1
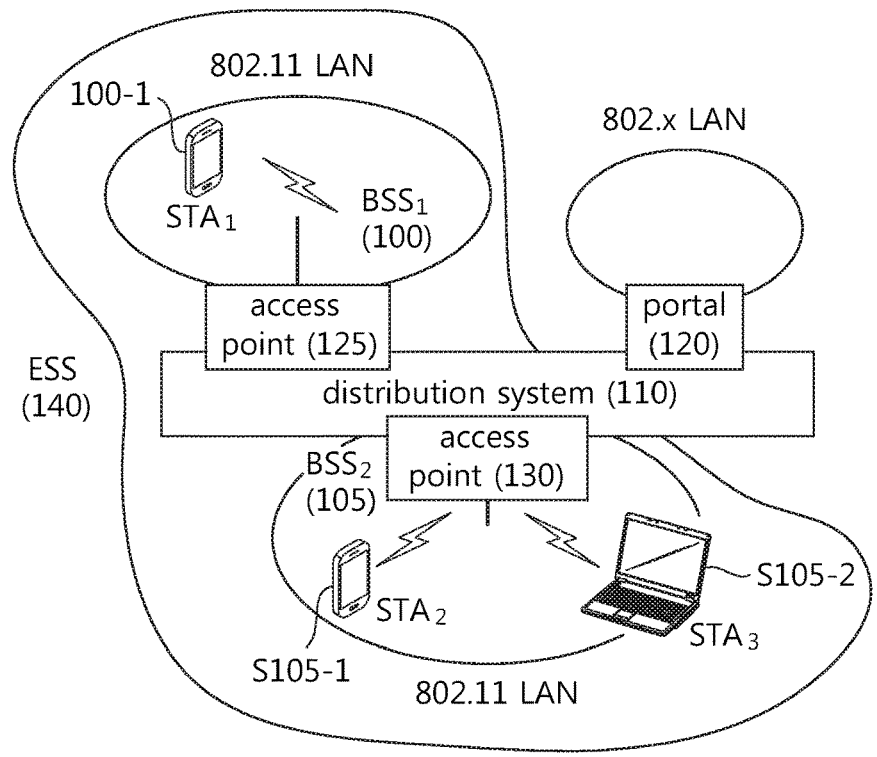
(A)
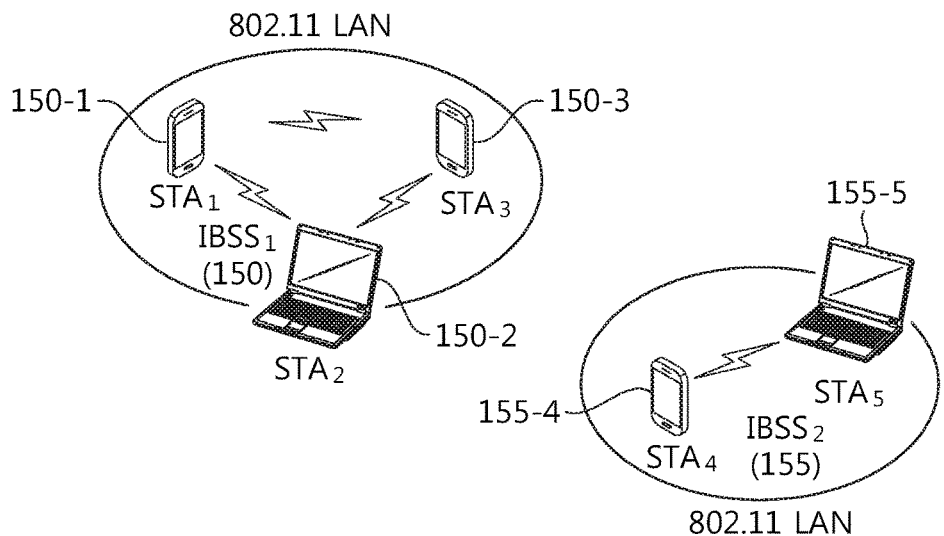
(B)

FIG. 6
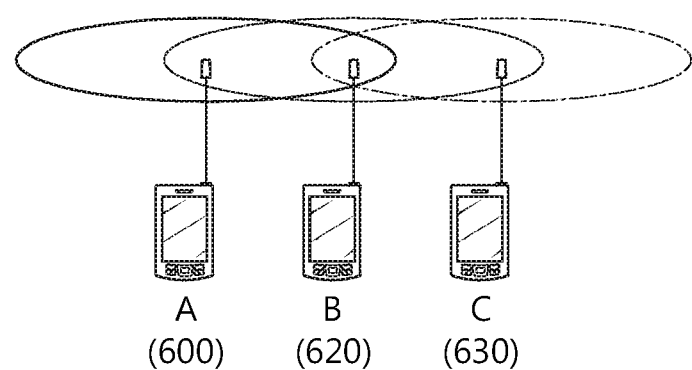
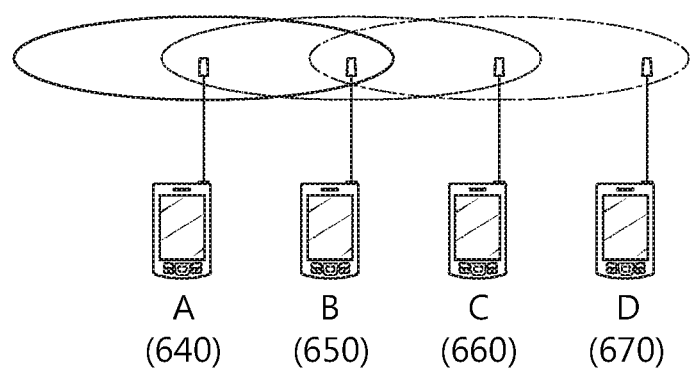

FIG. 7
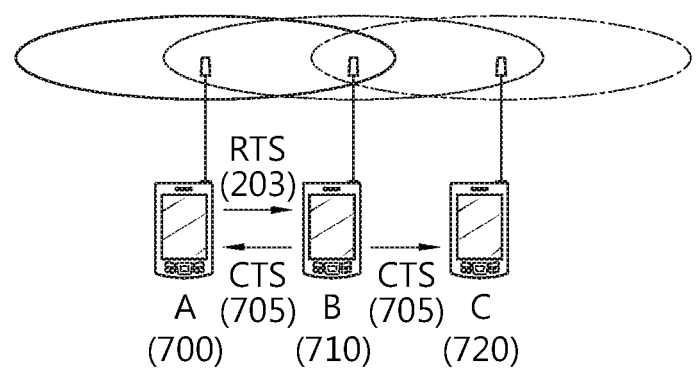
(A)
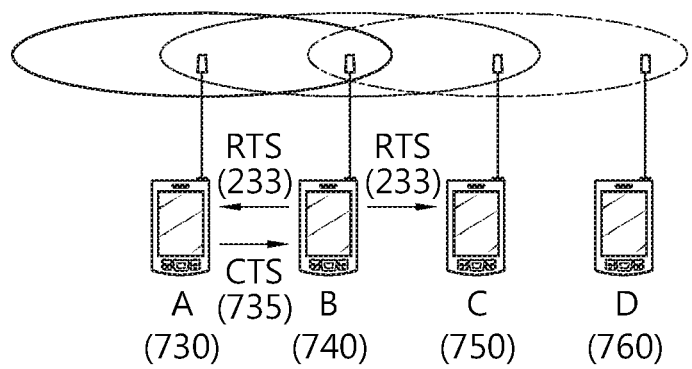
(B)

METHOD AND APPARATUS FOR REPORTING INFORMATION ABOUT TRANSMISSION FAILURE FRAME

CROSS-REFERENCE TO RELATED APPLICATIONS

This application is the National Stage filing under 35 U.S.C. 371 of International Application No. PCT/KR2014/003789, filed on Apr. 29, 2014, which claims the benefit of U.S. Provisional Application No. 61/871,321, filed on Aug. 29, 2013, the contents of which are all hereby incorporated by reference herein in their entirety.

BACKGROUND OF THE INVENTION

Field of the Invention

The present invention relates to wireless communications, and more particularly, to an operation of a station (STA) when frame transmission fails.

Related Art

The Institute of Electrical and Electronics Engineers (IEEE) 802.11 Wireless Next Generation Standing Committee (WNG SC) is an ad hoc committee which conducts medium- and long-term examinations on a next-generation wireless local area network (WLAN).

At the IEEE conference in March, 2013, Broadcom suggested, based on the WLAN standardization history, the need for discussions on the next-generation WLAN subsequent to IEEE 802.11ac in the first half of 2013 when the IEEE 802.11ac standards were finalized. On the basis of technical necessity and need for standardization, a motion for creating a study group for the next-generation WLAN was carried at the IEEE conference in March, 2013.

The scope of the HEW mainly discussed by the study group for the next-generation WLAN so called a high efficiency WLAN (HEW) includes 1) improvement in a 802.11 physical (PHY) layer and medium access control (MAC) layer in 2.4 GHz and 5 GHz bands, 2) increase in spectrum efficiency and area throughput, and 3) performance improvement in actual indoor and outdoor environments, such as environments including interference sources, crowded heterogeneous networks and environments having high user load. The HEW mostly considers a scenario of an environment crowed with access points (APs) and stations (STAs), and the HEW conduct discussions on improvement in spectrum efficiency and area throughput in this situation. In particular, the HEW pays attention to improvement in practical performance not only in indoor environments but also in outdoor environments, which are not substantially considered in existing WLANs.

The HEW pays substantial attention to scenarios for a wireless office, a smart home, a stadium, a hotspot and a building/apartment, and discussions on system performance improvement in an environment crowed with APs and STAs based on a corresponding scenario are conducted.

Discussions are expected to be vigorous on system performance improvement in an overlapping basic service set (OBSS) environment and outdoor environment, instead of single link performance improvement in a single basic service set (BSS), and on cellular offloading. This HEW orientation means that the next-generation WLAN gradually has a similar technological scope to that of mobile communication. Considering that mobile communication technology is discussed along with WLAN technology in small cell and direct-to-direct (D2D) communications areas, technological and business convergence of the next-generation WLAN based on the HEW and mobile communication is expected to be further promoted.

SUMMARY OF THE INVENTION

The present invention provides a method of reporting information about a transmission failure frame.

The present invention also provides a station (STA) for reporting information about a transmission failure frame.

According to one aspect of the present invention, in order to achieve the aforementioned purpose of the present invention, a method of reporting information about a transmission failure frame in a wireless local area network (WLAN) may include: creating, by a station (STA), a retransmission frame; and transmitting, by the STA, the retransmission frame to an access point (AP). The retransmission frame may include information about the transmission failure frame. The information about the transmission failure frame may include timestamp information and duration information. The timestamp information may include information about a transmission start time of the transmission failure frame. The duration information may include information about a transmission duration of the transmission failure frame.

According to another aspect of the present invention, in order to achieve the aforementioned purpose of the present invention, an STA for reporting information about a transmission failure frame in a WLAN may include: a radio frequency (RF) unit for transmitting and receiving a radio signal; and a processor operatively coupled to the RF unit. The processor may be implemented to create a retransmission frame and to transmit the retransmission frame to an AP. The retransmission frame may include information about the transmission failure frame. The information about the transmission failure frame may include timestamp information and duration information. The timestamp information may include information about a transmission start time of the transmission failure frame. The duration information may include information about a transmission duration of the transmission failure frame.

An access point (AP) can receive information about a transmission failure frame from a station (STA), and can determine a transmission failure cause on the basis of information about the received transmission failure frame. The AP can decrease a transmission failure rate by performing a procedure for decreasing the transmission failure rate according to the transmission failure cause.

BRIEF DESCRIPTION OF THE DRAWINGS

FIG. 1 is a concept view illustrating the structure of a wireless local area network (WLAN).

FIG. 6 shows the concept of a case where a state of a medium determined by an STA is different from a state of a real medium.

FIG. 7 shows the concept of a method of using an RTS frame and a CTS frame to solve a hidden node problem and an exposed node problem.

DESCRIPTION OF EXEMPLARY EMBODIMENTS

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
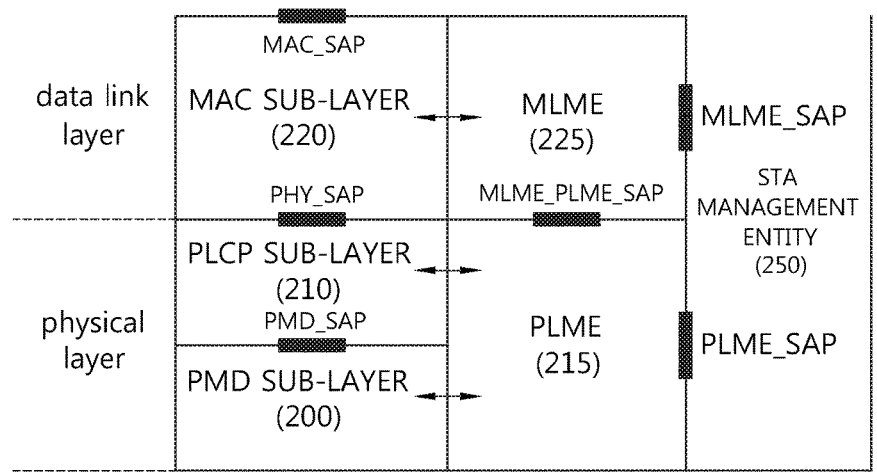
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted.

The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

Hereafter, a radio access method used in the IEEE 802.11 is disclosed.

Basically, MAC layer uses DCF (distributed coordination function) to share radio medium In IEEE 802.11, DCF as a CSMA/CA (carrier sense multiple access/collision avoidance) mechanism is used for the channel access.

Selectively, the MAC layer defines a method to share medium based on RTS (request to send)/CTS (clear to send). Channel access based on DCF is described as below.

Figure 3:
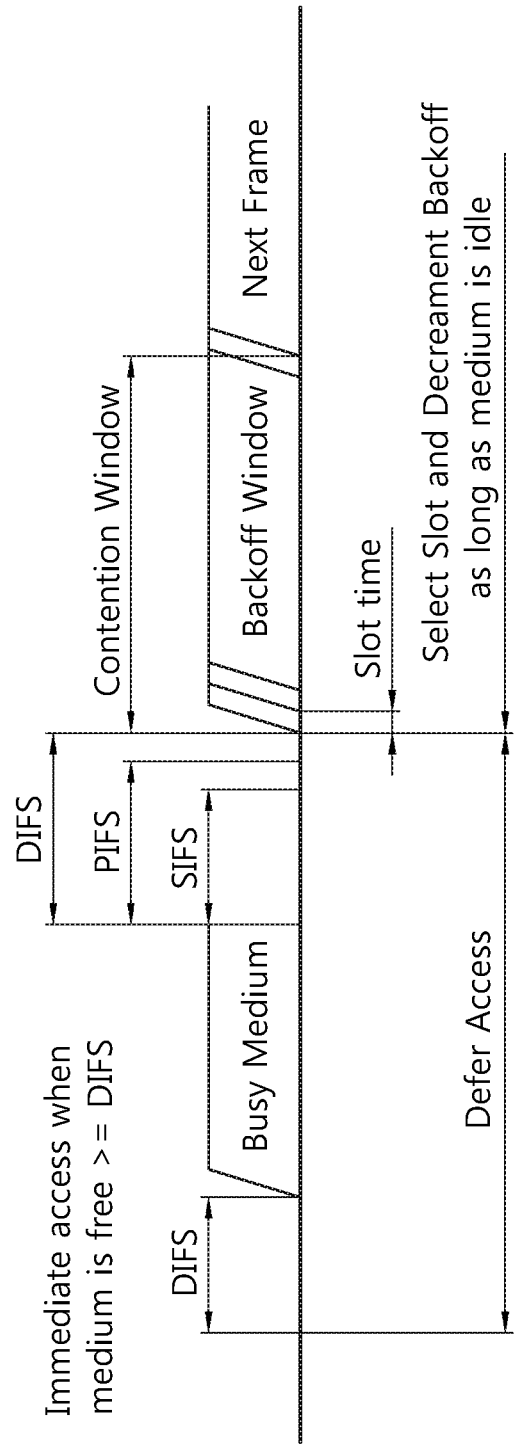
FIG. 3 shows the concept of a DCF-based channel access process.

FIG. 3 shows the concept of a DCF-based channel access process.

First, in the DCF-based channel access, an STA may determine whether to use a medium through a carrier sensing mechanism. If the medium is not in use longer than a DCF inter frame symbol (DIFS) duration (i.e., if a channel is idle), the STA may transmit a MAC protocol data unit (MPDU) of which transmission is imminent.

On the contrary, if the medium is in use during the DIFS duration (i.e., if the channel is busy), the STA may set a backoff time according to a random backoff algorithm.

The backoff time is a waiting time before transmitting a frame after the channel waits for a specific time (e.g., DIFS). The backoff time may be defined by the following equation.

BackoffTime=Random( )×aSlotTime   <Equation 1>

Random( ) is a function of calculating a pseudo-random integer selected with uniform distribution in the interval of [0, CW]. CW may be selected from an integer greater than or equal to aCWMin less than or equal to aCWMax. aCWMin and aCWmax may be determined according to physical (PHY) characteristics. aSlotTime may be a time unit defined according to the PHY characteristics.

The STA may determine whether the channel is idle, and if the channel is idle, may decrease the backoff time in unit of SlotTime. Before the backoff time is decreased in unit of SlotTime, the STA may determine again whether the channel is idle for a duration corresponding to the DIFS. If the backoff time is 0, the STA may perform the channel access.

Figure 4:
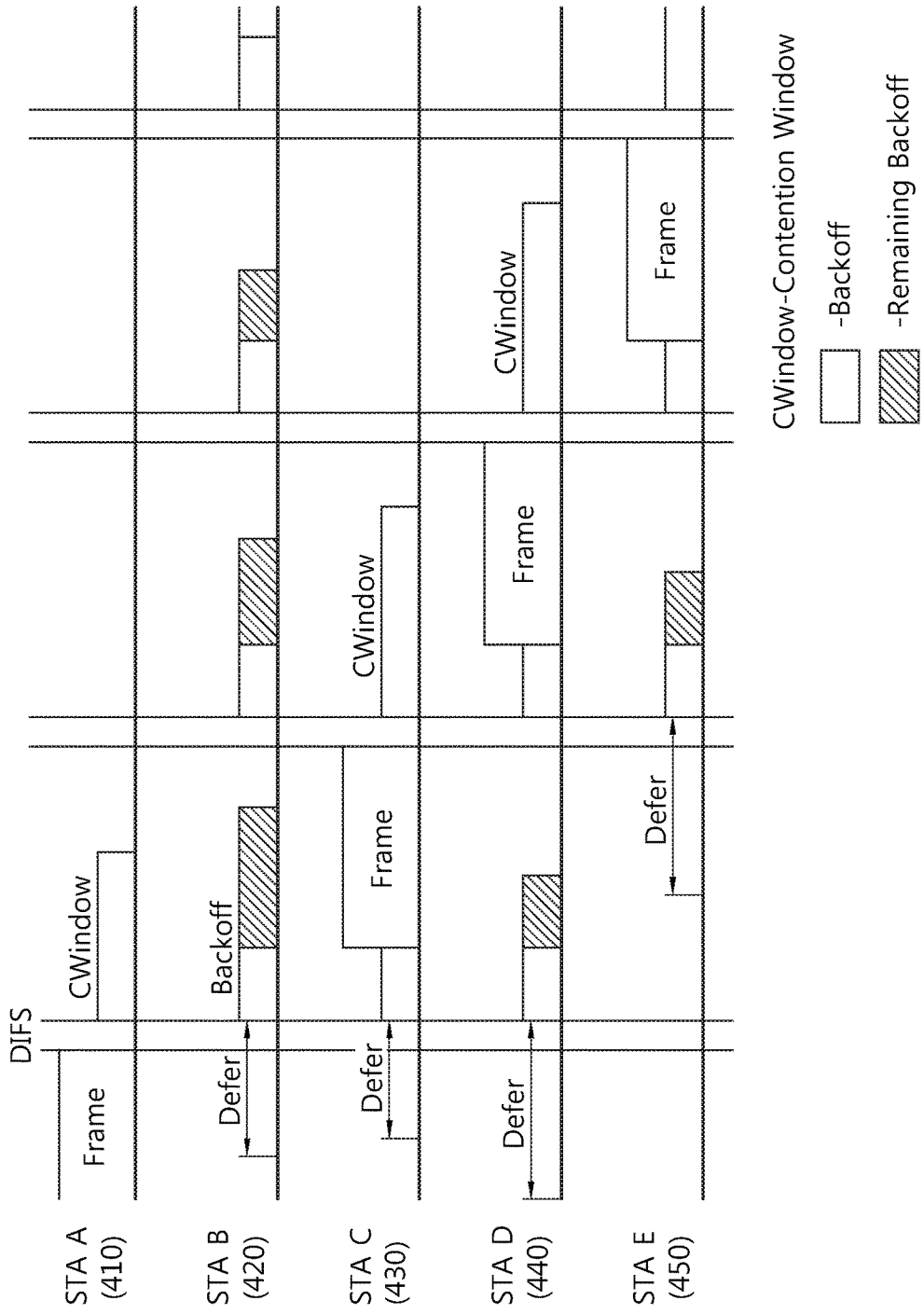
FIG. 4 shows the concept of a backoff procedure of a plurality of STAs.

FIG. 4 shows the concept of a backoff procedure of a plurality of STAs.

Referring to FIG. 4, a backoff time (or a size of a contention window (CW)) may be decreased after it is determined that a medium is idle for a DIFS duration. If an activity of the medium is not detected, the STA may decrease the backoff time in unit of SlotTime. If it is determined that the medium is in use during a backoff slot, the STA may defer the decrement of the backoff time. Frame transmission of the STA may start whenever a pre-set backoff timer reaches 0.

After frame transmission of an STA A, a backoff time which is set by each of an STA B, an STA C, and an STA D may be decreased. Among the STA B, the STA C, and the STA D, the STA C of which the backoff time is most rapidly decreased to 0 may transmit a frame through the medium. If the STA C transmits the frame, the decrement of the backoff time of the STA B and the STA D may be deferred.

Further, a DCF transmission scheme includes an RTS/CTS access mode in which control frames (e.g., RTS and CTS) are exchanged before a data frame is transmitted. This scheme can reduce a channel waste by replacing a collision which may occur when the STA transmits a data frame with a collision caused by a relatively short control frame. The RTS/CTS access mode will be described later.

As another method for sharing a radio medium by a plurality of STAs in a MAC layer, a point coordination function (PCF) may be defined. The aforementioned DCF is a CSMA/CA-based channel access. Therefore, real-time transmission of data transmitted between an STA and an AP cannot be guaranteed. On the contrary, the PCF may be used as a method for providing quality of service (QoS) in real-time data transmission. Unlike the DCF, the PCF is a non-contention based transmission service. The PCF may be used alternately with a DCF-type contention based service, rather than exclusively using the entire medium transmission duration. In the PCF, a point coordinator implemented in the AP of a BSS may control a right to occupy the medium by each STA by using a polling scheme. The PCF which is an inter-frame space (IFS) in the PCF may be set to be smaller than the DIFS which is an IFS of the DCF. By using this method, an STA which has access to a medium on the basis of the PCF may have a priority over an STA having access to a channel on the basis of the DCF. The IFS denotes an interval between frames, and may be used to set a priority according to which the STA has access to the medium. The IFS may be specifically defined as follows.

Figure 5:
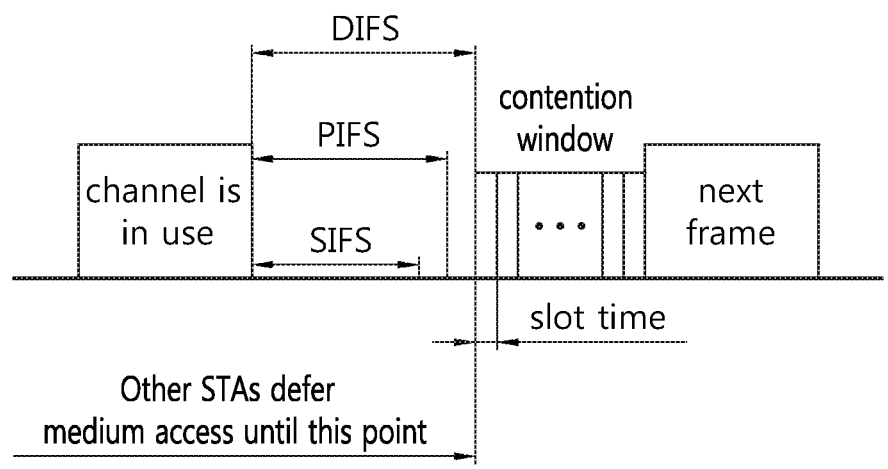
FIG. 5 shows the concept of an interval between frames.

FIG. 5 shows the concept of an interval between frames.

Referring to FIG. 5, an interval between two frames may be referred to as an inter-frame symbol (IFS). An STA may use a carrier sensing scheme to determine whether a channel is used for a time duration of the IFS as defined in the standard. A MAC layer using a DCF defines a plurality of IFSs. A priority of an STA occupying a radio medium may be determined by the IFS. The interval between frames is dependent on an IFS type, and is defined as follow.

(1) SIFS (short inter frame symbol): It is used in RTS/CTS, ACK frame transmission. Top priority.

(2) PIFS (PCF IFS): It is used in frame transmission of an STA operating based on PCF.

(3) DIFS (DCF IFS): It is used in frame transmission of an STA operating based on DCF.

(4) EIFS (extended IFS): It is used only when an error occurs in frame transmission, and is not a fixed duration.

When DCF is used as a method of sharing a wireless medium by a plurality of STAs in a MAC layer, several problems may occur. For example, if the plurality of STAs simultaneously perform an initial access when using the DCF, frames transmitted by the plurality of STAs may collide. In addition, there is no concept on a transmission priority in the DCF. Therefore, a quality of service (QoS) cannot be guaranteed as to traffic data transmitted by the STA. In order to solve such a problem, a hybrid coordination function (HCF) is defined in IEEE 802.11e as a new coordination function. As a channel access mechanism, the HCF defines an HCF controlled channel access (HCCA) and an enhanced distributed channel access (EDCA).

The EDCA and the HCCA may define traffic categories indicating transmission priorities. A priority for performing a channel access may be determined on the basis of the traffic access categories. That is, different CWs and IFSs may be defined differently according to categories of traffic data transmitted by the STA. The different CWs and IFSs may determine a channel access priority depending on the categories of traffic data.

For example, if traffic data is an e-mail, the traffic data may be assigned to a low priority class for transmission. For another example, if the traffic data is voice communication through a wireless local area network (WLAN), the traffic data may be assigned to a high priority class for transmission.

In case of using EDCA, traffic data having a high priority may have more transmission opportunities than traffic data having a low priority. In addition, on average, an STA which transmits high-priority traffic may have a shorter waiting time than an STA which transmits low-priority traffic before transmitting a packet. In the EDCA, a transmission priority may be implemented by allocating a shorter CW to higher-priority traffic than that of lower-priority traffic while assigning an arbitration inter-frame space (AIFS) that is shorter than the IFS which is a frame interval defined in the DCF. Further, the EDCA enables an STA to access a channel without contention during a period that is referred to as a transmit opportunity (TXOP). During the TXOP period determined within a range not exceeding a maximum duration of the TXOP, the STA may transmit as many packets as possible. If one frame is too long to be entirely transmitted during one TXOP period, it may be transmitted by being split into small frames. The use of the TXOP may reduce a situation in which an STA having a low transfer rate excessively occupies a channel, which is a problem of the conventional 802.11 DCF MAC.

In the aforementioned channel access method, a collision may occur in data transmission if an STA incorrectly senses whether a medium is idle when performing medium sensing based on a carrier sensing mechanism. A case where a state of a medium determined by the STA is different from a state of a real medium is shown below in FIG. 6.

FIG. 6 shows the concept of a case where a state of a medium determined by an STA is different from a state of a real medium.

A hidden node issue is shown in an upper portion of FIG. 6, and an exposed node issue is shown in a lower portion of FIG. 6.

A case where an STA A 600 is communicating with an STA B 620 and an STA C 630 has information to be transmitted to the STA B 620 is assumed in the upper portion of FIG. 6. If the STA A 600 transmits data to the STA B 620, a channel medium for transmitting data to the STSA B 620 is occupied by the STA A 600.

The STA C 630 may perform carrier sensing on the medium before transmitting data to the STA B 620. Due to a transmission coverage of the STA A 600, even if the STA A 600 is communicating with the STA B 620, the STA C 630 may determine that the medium for transmitting the data to the STA B 620 is in an idle state. In this case, the STA C 630 may transmit the data to the STA B 620. Eventually, the data of the STA A 600, which is to be transmitted to the STA B 620, may collide with the data of the STA C 630. In this case, the STA A 600 may be a hidden node of the STA C 630.

A case where the STA B 650 transmits data to the STA A 640 is assumed in the lower portion of the FIG. 6. The STA C 660 may perform carrier sensing to know whether a medium is occupied by another STA. Since it is a state in which the STA B 650 transmits information to the STA A 640, the STA C 660 may sense that it is a state in which a medium is occupied. Therefore, the STA C 660 may not be able to transmit data to an STA D 670. The STA C 650 must defer data transmission to the STA D 670 until unnecessary data transmission caused by the STA B 640 is finished. That is, the STA A 640 may prevent data transmission of the STA C 660 even though it exists outside a carrier sensing range. In this case, the STA C 660 is an exposed node of the STA B 650.

In order to solve the aforementioned hidden node problem and exposed node problem of FIG. 6, whether a medium is occupied can be sensed in a WLAN by using an RTS frame and a CTS frame.

FIG. 7 shows the concept of a method of using an RTS frame and a CTS frame to solve a hidden node problem and an exposed node problem.

In FIG. 7, in order to solve the hidden node problem and the exposed node problem, a method of transmitting a short signaling frame (e.g., a request to send (RTS) frame, a clear to send (CTS) frame, etc.) by an STA is disclosed. Neighboring STAs may determine whether to transmit data on the basis of the RTS frame and CTS frame transmitted/received between two STAs performing communication.

Transmission of an RTS frame 703 and a CTS frame 705 for solving a hidden node problem is shown in an upper portion of FIG. 7.

It may be assumed a case where both of an STA A 700 and an STA C 720 intend to transmit data. When the STA A 700 transmits the RTS frame 703 to an STA B 710, the STA B 710 may transmit the CTS frame 705. A CTS frame 704 may be transmitted to both of the neighboring STA A 700 and STA C 720. The STA C 720 may sense a presence of the STA A 700 for transmitting data to the STA B 710 by receiving the CTS frame 705. After communication between the STA A 700 and the STA B 710 ends, the STA B 720 may transmit data to the STA B 710. By using this method, a data collision caused by a node may not occur.

Transmission of an RTS frame 733 and a CTS frame 735 for solving an exposed node problem is shown in a lower portion of FIG. 7.

When performing communication, an STA A 730 and an STA B 740 may transmit the RTS frame 733 and the CTS frame 735. An STA C 750 may receive only the RTS frame 733, and may know that the STA A 730 is located outside a carrier sensing range of the STA C 750. Therefore, the STA C 750 may transmit data to an STA D 760.

An RTS frame format and a CTS frame format are disclosed in the 8.3.1.2 RTS frame format and 8.3.1.3 CTS frame format of the IEEE 802.11 spec.

Although a hidden node (or a hidden STA) is not detected by carrier sensing of a specific STA, the specific STA may produce interference when transmitting data to another STA. There may be a high possibility of a collision between data transmitted by the hidden node of the specific STA (hereinafter, referred to as the hidden node) and data transmitted by the specific STA. The data collision may result in a decrease in system performance. Therefore, as described above, the RTS frame and the CTS frame may be used to avoid the data collision caused by the hidden node. However, an overhead of a management frame may be increased when the RTS frame and the CTS frame are transmitted in data transmission.

In an embodiment of the present invention, an AP can acquire information for detecting a hidden node of a specific STA. On the basis of information for detecting the hidden node (hereinafter, referred to as information for detecting hidden node), the AP may decrease a possibility of a collision between data transmitted by the specific STA and data transmitted by the hidden node.

The information for detecting hidden node transmitted by the STA may be a variety of information. For example, the information for detecting hidden node may include identification information of another STA for transmitting a frame which is overheard by the STA, and when frame transmission caused by the STA fails, a transmission start time of the transmission failure frame, transmission duration information, or the like.

Hereinafter, an embodiment of the present invention discloses a method of detecting a hidden node of an STA.

Figure 8:
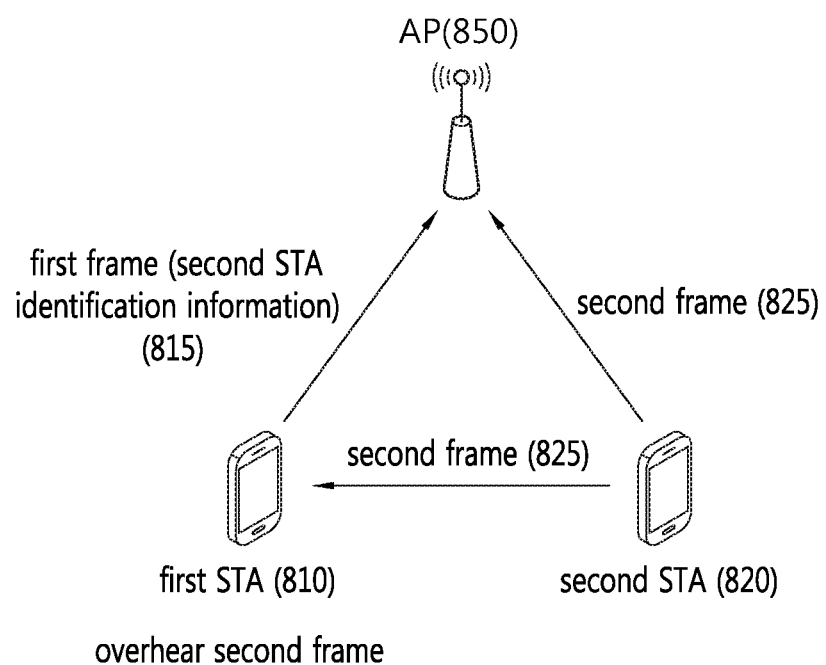
FIG. 8 shows the concept of a method of detecting a hidden node according to an embodiment of the present invention.

FIG. 8 shows the concept of a method of detecting a hidden node according to an embodiment of the present invention.

A method in which an STA transmits information included in an overheard frame to an AP as information for detecting hidden node is disclosed in FIG. 8.

Referring to FIG. 8, a first STA 810 may overhear a second frame 825 transmitted by a second STA 820. Since the first STA 810 can sense the frame transmitted by the second STA 820, the second STA 820 may not be a hidden node of the first STA 810. That is, another STA for transmitting the frame to be overheard by the STA may not be the hidden node of the STA.

The first STA 810 may transmit, to an AP 850, identification information of the second STA 820 for transmitting the second frame 825. The identification information of the second STA 820 may be transmitter address (TA) field information included in an MAC header of the overheard second frame 825. The AP 850 may generate a hidden node map of the first STA 810 on the basis of the received identification of the second STA 820.

The AP 850 may acquire information indicating that the second STA 820 is not a hidden node for the first STA 810 on the basis of the identification of the second STA 820, which is transmitted by the first STA 810. By using this information, the AP 850 may generate the hidden node map of the first STA 810. The hidden node map of the first STA 810 may include information regarding the hidden node of the first STA 810.

Specifically, the AP 850 may configure the hidden node map of the first STA 810 including the hidden node of the first STA 810 other than the second STA 820. Alternatively, the AP 850 may configure the hidden node map including information about a non-hidden node, rather than the hidden node. For example, the AP 850 may generate the hidden node map for the first STA 810 by configuring the second STA 820 as the non-hidden node of the first STA 810.

According to another embodiment of the present invention, the AP 850 may configure not only the hidden node map of the first STA 810 but also the hidden node map of the second STA 820 on the basis of identification information of the second STA 820 for transmitting the second frame 825 to be overheard by the first STA 810. The AP 850 may determine the first STA 810 and the second STA 820 as an STA which is present in a location where mutual carrier sensing is possible. Therefore, it may be determined that the first STA 810 is not the hidden node of the second STA 820 on the basis of the identification information of the second STA 820 for transmitting the second frame 825 to be overheard by the first STA 810.

The first STA may transmit information included in the overheard frame to the AP 850 through various methods. For example, the first STA 810 may collect TA information included in the overheard frame. The first STA 810 may overhear a frame transmitted by not only the second STA 820 but also another STA, and may collect the TA information included in the overheard frame. If there is data to be transmitted to the AP 850, the first STA 810 may transmit the collected TA information by piggybacking it on a data frame. Alternatively, the first STA 810 may transmit the TA information included in the overheard frame to the AP 850 by using an additional PPDU format defined to transmit the TA information included in the overheard frame.

Figure 9:
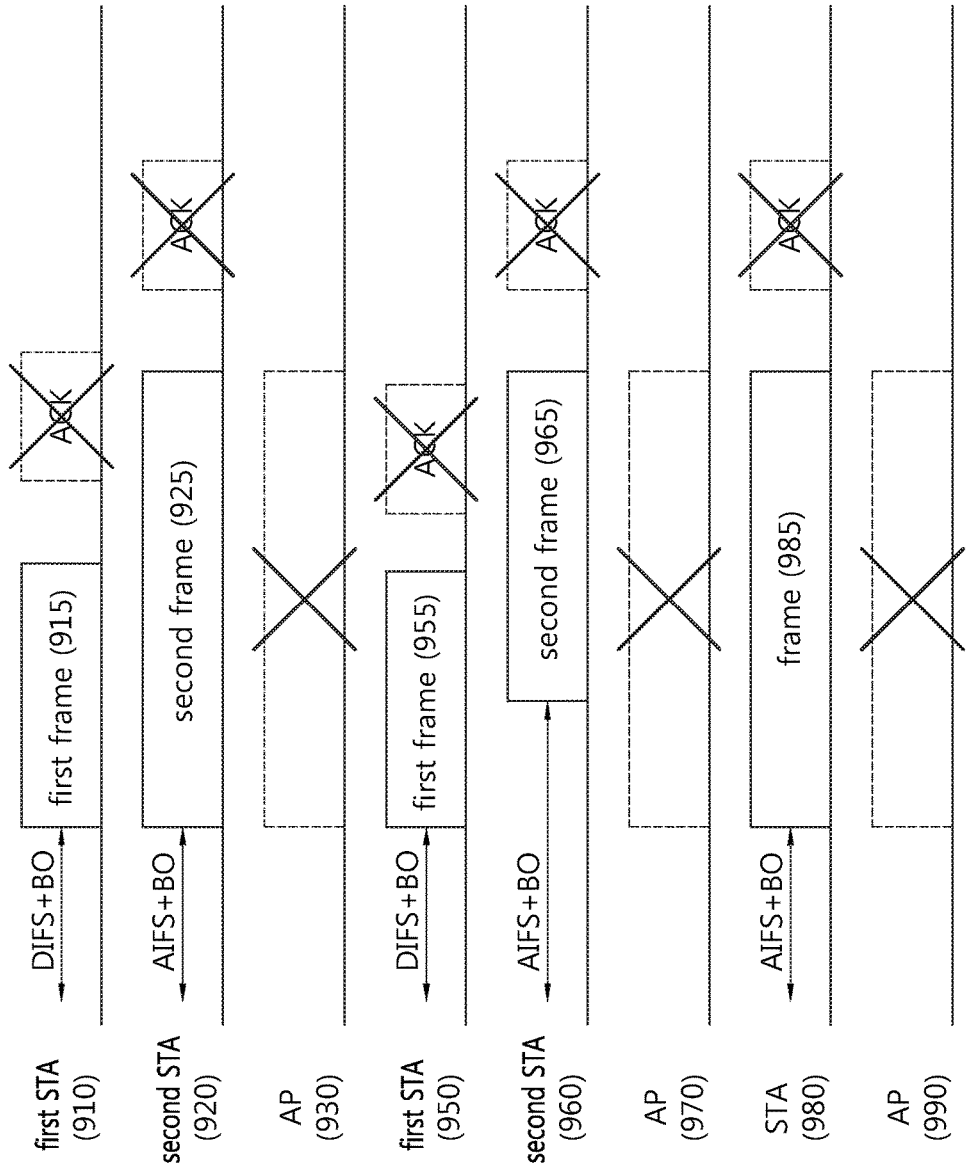
FIG. 9 shows the concept of a case where an STA fails to receive ACK for a frame transmitted from an AP according to an embodiment of the present invention.

FIG. 9 shows the concept of a case where an STA fails to receive ACK for a frame transmitted from an AP according to an embodiment of the present invention.

A collision between frames transmitted respectively by a plurality of STAs when the plurality of STAs transmit a frame in the same time slot is shown in an upper portion of FIG. 9. In a case where each of the plurality of STAs transmits a frame at the same transmission start time (e.g., in case of the same time slot), a delay time for a channel access of each of the plurality of STAs may be identical with respect to a specific time.

Referring to the upper portion of FIG. 9, a first STA 910 may wait by a sum of a DIFS and a first backoff time to transmit a first frame 915. A second STA 920 may wait by a sum of an AIFS and a second backoff time to transmit a second frame 925. If the sum of the DIFS and the first backoff time is equal to the sum of the AIFS and the second backoff time with respect to the specific time, the first STA 910 may not be able to perform sensing on transmission of the second frame 925 of the second STA 920, and the second STA 920 may not be able to perform sensing on transmission of the first frame 915 of the first STA 910. Therefore, the first STA 910 and the second STA 920 may respectively transmit the first frame 915 and the second frame 925 at the same time, and the first frame 915 and the second frame 925 transmitted respectively from the first STA 910 and the second STA 920 may collide. The first STA 910 and the second STA 920 may not be able to receive ACK for the first frame 915 and the second frame 925 respectively from an AP 930 due to a collision of the first frame 915 and the second frame 925.

That is, a case where a plurality of STAs perform a channel access in the same time resource (e.g., a time slot) by chance during a DCF-based channel access and thus medium occupation of another STA is not sensed is shown in the upper portion of FIG. 9. That is, an inter-frame collision disclosed in the upper portion of FIG. 9 may not be an inter-frame collision generated by a hidden node.

The concept of an inter-frame collision caused by a hidden node is shown in a middle portion of FIG. 9.

In the middle portion of FIG. 9, a first STA 950 may be a hidden node of a second STA 960. Also in a case where the first STA 950 transmits a first frame 955 to an AP 970, the second STA 960 cannot sense transmission of the first frame 955 of the first STA 950 through carrier sensing. Therefore, during the first STA 950 transmits the first frame 955 to the AP 970, the second STA 960 may transmit a second frame 965 to the AP 970. In this case, the first frame 955 transmitted by the first STA 950 may collide with the second frame 965 transmitted by the second STA 960. Therefore, the first STA 950 may not be able to receive ACK for the first frame 955 from the AP 970, and the second STA 960 may not be able to receive ACK for the second frame 965 from the AP 970.

That is, an inter-frame collision caused by a hidden node is shown in the middle portion of FIG. 9, which may occur also in a case where a plurality of STAs do not perform a channel access in the same time resource (e.g., a time slot) by chance. Although it has been described in the middle portion of FIG. 9 that two STAs are present for convenience of explanation, if a plurality of STAs are hidden nodes to each other, a collision may also occur in frames respectively transmitted by the plurality of STAs.

A case where ACK is not received for a frame 985 transmitted by one STA 980 is shown in an lower portion of FIG. 9. If the inter-frame collision does not occur, the STA 980 may not be able to receive ACK for the frame 985 from an AP 990 due to various causes. For example, if a channel state is not good due to interference or the like, the frame 985 transmitted from the AP 990 by the STA 980 may not be decoded by the AP 990, and may not be able to receive ACK from the AP 990.

According to an embodiment of the present invention, if ACK is not received from an AP in response to a frame transmitted by an STA, the STA may transmit information about a time resource for starting transmission of a frame not receiving ACK (hereinafter, referred to as timestamp information of a transmission failure frame) and/or duration information to the AP.

Timestamp information of the transmission failure frame may be determined on the basis of a value of a time synchronization function (TSF) timer which is set by a beacon frame. A reference TSF timer value included in the beacon frame may be used to synchronize a TSF timer of STAs included in a BSS. If a TSF timer value of the STA is different from a reference timestamp value included in the received beacon frame, the STA may adjust the reference timestamp value included in the beacon frame. The reference timestamp value may be the reference TSF timer value.

That is, the timestamp information of the transmission failure frame may be determined through a TSF timer of the STA, which is set on the basis of the reference timestamp value.

The duration information may include information about a time resource related to frame transmission. The duration information may be defined in various forms. For example, the duration information may be information included in a duration field included in a medium access control (MAC) header. For another example, the duration information may include information about a time resource regarding a time until a frame is transmitted and ACK for the frame is received. For another example, frame length information (e.g., length information of a frame defined in a legacy (L)-signal(S) included in a physical layer convergence procedure (PLCP)) or the like may be used as the duration information.

Figure 10:
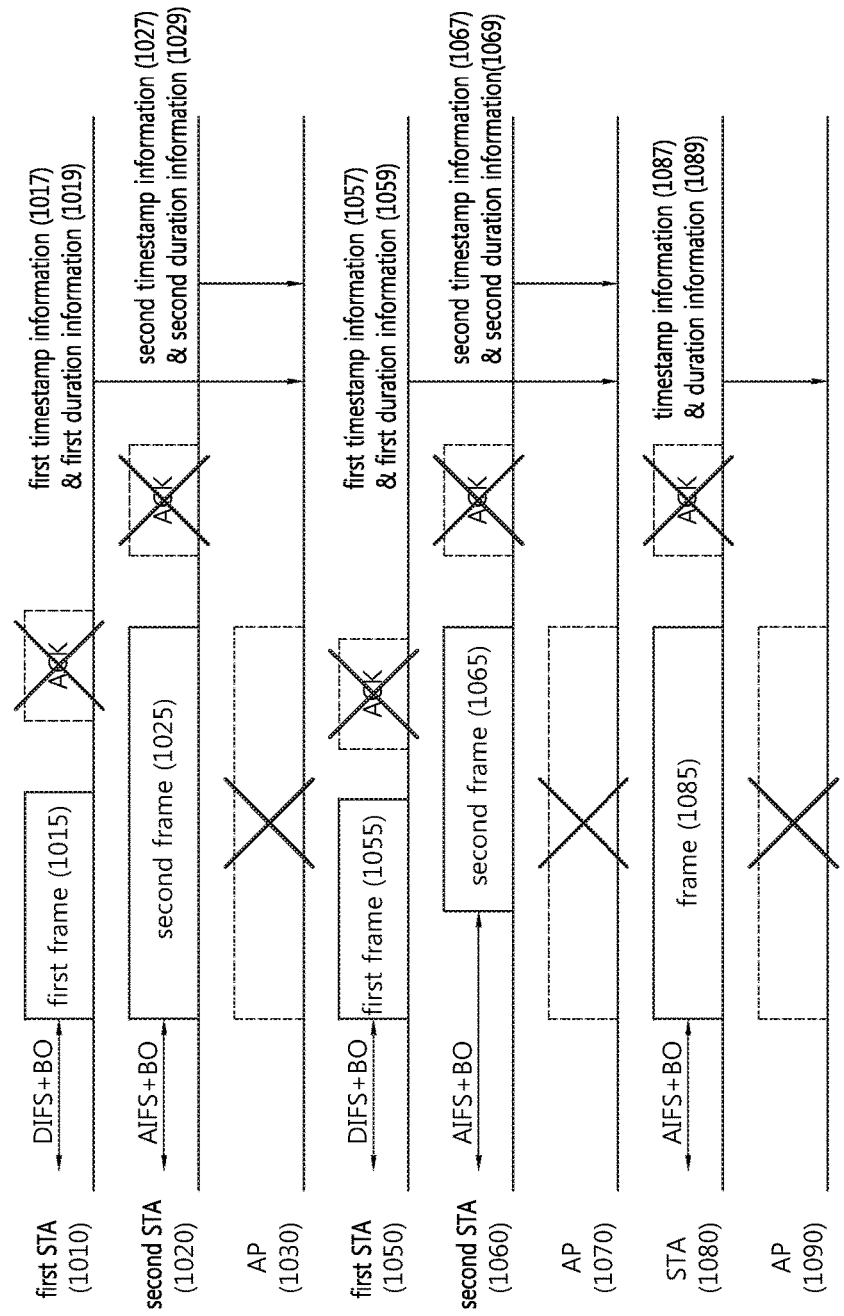
FIG. 10 shows the concept of a method of determining a cause of a frame transmission failure of an STA on the basis of information received by an AP from an STA according to an embodiment of the present invention.

FIG. 10 shows the concept of a method of determining a cause of a frame transmission failure of an STA on the basis of information received by an AP from an STA according to an embodiment of the present invention.

According to the embodiment of the present invention, the STA may transmit to the AP the duration information and the timestamp information of the transmission failure frame for which ACK cannot be received from the AP. The AP may determine whether frame transmission performed by a hidden node has failed on the basis of the duration information and the timestamp information of the transmission failure frame received from at least one STA. The timestamp information of the transmission failure frame is one example of information about a time resource for starting transmission of the transmission failure frame.

In an upper portion of FIG. 10, if transmission on a first frame 1015 has failed, a first STA 1010 may transmit first timestamp information 1017 and first duration information 1019 for the first frame 1015. Likewise, if transmission on a second frame 1025 has failed, a second STA 1020 may transmit second timestamp information 1027 and second duration information 1029 for the second frame 1025.

The first timestamp information 1017 and the second timestamp information 1027 may indicate the same timestamp. Further, the first duration information 1019 and the second duration information 1029 may indicate that the first frame 1015 and the second frame 1025 have an overlapping transmission duration.

Therefore, if the first timestamp information 1017 of the first frame 1015 and the second timestamp information 1027 of the second frame 1025 indicate the same timestamp and if the first duration information 1019 of the first frame 1015 and the second duration information 1029 of the second frame 1025 indicate the overlapping of the transmission duration of the first frame 1015 and the second frame 1025, an AP 1030 may determine the first STA 1010 and the second STA 1020 as STAs in which an inter-frame collision occurs, by selecting the same time resource when performing a channel access.

In this case, the AP 1030 may differently set a first channel access parameter for the first STA 1010 and a second channel access parameter for the second STA 1020. For example, the AP may differently set a contention window size and/or an arbitration inter frame symbol (AIFS) size with respect to the first STA 1010 and the second STA 1020, thereby differently setting delay times before the channel access. Alternatively, the AP 1030 may differently set a time resource and/or a frequency resource for performing the channel access by the first STA 1010 and the second STA 1020 through load balancing.

In case of a middle portion of FIG. 10, first timestamp information 1057 of a first frame 1055 transmitted by a first STA 1050 and second timestamp information 1067 of a second frame 1065 transmitted by a second STA 1060 may not be equal to each other.

Further, first duration information 1059 of the first frame 1055 transmitted by the first STA 1050 and second duration information 1069 of the second frame 1065 transmitted by the second STA 1060 may indicate that the first frame 1055 and the second frame 1065 have an overlapping transmission duration.

Therefore, the first timestamp information 1057 and the second timestamp information 1067 indicate different timestamps and if the first duration information 1059 and the second duration information 1069 indicate the overlapping of the transmission duration of the first frame 1055 and the second frame 1065, an AP 1070 may determine this as an inter-frame collision caused by a hidden node. Specifically, the AP 1070 may determine the first STA 1050 of which a timestamp is relatively fast as a hidden node for the second STA 1060 of which a timestamp is relatively slow. Alternatively, the AP 1070 may determine that the first STA 1050 and the second STA 1060 are hidden nodes with each other. For convenience of explanation, it is assumed that the AP 1070 determines the first STA 1050 as a hidden node for the second STA 1060.

In this case, the AP 1070 may differently set a first channel access parameter of the first STA 1050 and a second channel access parameter of the second STA 1060. For example, since a contention window size and/or an AIFS size for the first STA 1050 and the second STA 1060 are set differently, a delay time before the channel access may be set differently, thereby being able to decrease a probability of a collision occurrence caused by a hidden node.

In another method, the AP 1070 may allocate different transmission resources to the second STA 1060 and the first STA 1050 which is a hidden node of the second STA 1060. The first STA 1050 and the second STA 1060 can avoid a frame collision caused by a channel access of the hidden node by differently allocating a time resource and/or a frequency resource for performing the channel access.

In another method, the AP 1070 may mandate transmission and/or reception of a CTS frame and an RTS frame to the STA. Upon receiving the CTS frame, the second STA 1060 may not perform the channel access during a specific time duration. Upon receiving the RTS frame from each of the first STA 1050 and the second STA 1060, the AP 1070 may not transmit the CTS frame. The AP 1070 may mandate transmission and reception of the CTS frame and the RTS frame on the basis of an announcement frame.

Although two STAs are assumed in the upper portion of FIG. 10 and the middle portion of FIG. 10 for convenience of explanation, the decision on a frame collision of an AP may also be applied to a plurality of STAs.

In a lower portion of FIG. 10, an STA 1080 may determine that a frame transmitted by the STA 1080 on the basis of timestamp information 1087 and duration information 1089 for a transmission failure frame 1085 received from the STA 1080 does not collide with a frame transmitted from another STA. For example, upon receiving the timestamp information 1087 and duration information 1089 for the transmission failure frame 1085 only from one STA 1080, an AP 1090 may determine this not as a collision with other frames but as a transmission failure caused by other factors such as interference.

In this case, the AP may change a transmission (Tx) rate on the basis of a method such as link adaptation.

According to anther embodiment of the present invention, as shown in the upper portion of FIG. 10, if the first timestamp information 1017 of the first frame 1015 transmitted by the first STA 1010 and the second timestamp information 1027 of the second frame 1025 transmitted by the second STA 1020 indicate the same timestamp, it may be determined that the frames 1015 and the 1025 transmitted respectively by the first STA 1010 and the second STA 1020 overlap, and thus whether the overlapping occurs may not have to be determined additionally through a duration field.

The timestamp information and duration information of the transmission failure frame disclosed in FIG. 10 may be transmitted by being included in a retransmission frame of the STA. For example, the timestamp information and the duration information may be transmitted by being piggybacked on the retransmission frame. Alternatively, the STA may transmit the timestamp information and the duration information to the AP by using an additional PPDU format for transmitting the timestamp information and the duration information.

Figure 11:
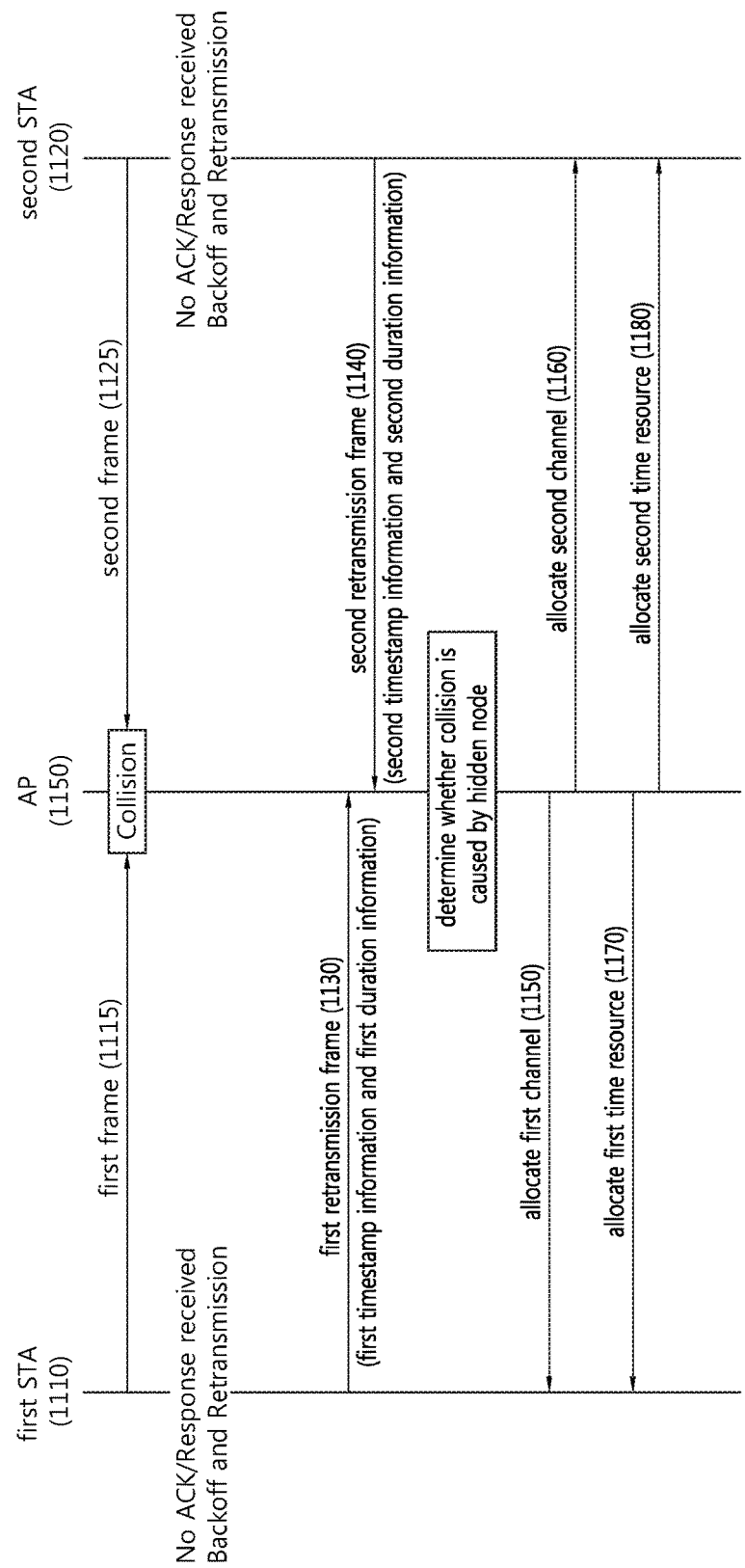
FIG. 11 is a flowchart showing a resource allocation method when a data collision occurs due to a hidden node according to an embodiment of the present invention.

FIG. 11 is a flowchart showing a resource allocation method when a data collision occurs due to a hidden node according to an embodiment of the present invention.

In FIG. 11, if an AP determines that an inter-frame collision is caused by a hidden node as shown in the middle portion of FIG. 10, a method of allocating a resource to an STA and the hidden node is disclosed. A first STA is assumed as a hidden node for a second STA.

Referring to FIG. 11, a first frame 1115 transmitted by a first STA 1110 may collide with a second frame 1125 transmitted by a second STA 1120.

If the first frame 1115 and the second frame 1125 collide, the first STA 1110 and the second STA 1120 may receive ACK for the first frame 1115 and the second frame 1125, respectively. If the ACK for each of the first frame 1115 and the second frame 1125 is not received, the first STA 1110 and the second STA 1120 may retransmit a frame. A first retransmission frame 1130 to be retransmitted may include first timestamp information and first duration information of the first frame 1115. A second retransmission frame 1140 to be retransmitted may include second timestamp information and second duration information of the second frame 1125.

If a time resource indicated by the timestamp information of the first frame 1115 and a time resource indicated by the timestamp information of the second frame 1125 are not equal to each other and if a transmission duration of a first transmission failure frame determined based on the first duration information overlaps with a transmission duration of a second transmission failure frame determined based on the second duration information, an AP 1150 may determine a collision between the frames 1115 and 1125 as a collision caused by a hidden node.

In this case, the AP 1150 may differently allocate a time resource and/or frequency resource allocated to the first STA 1110 and the second STA 1120.

For example, the AP 1150 may allocate a first channel 1150 to the first STA 1110 through an uplink channel, and may allocate a second channel 1160 to the second STA 1120. By using this method, the second STA 1120 and the first STA 1110 which is a hidden node for the second STA 1120 may not operate in the same channel, and a collision between frames transmitted respectively by the first STA 1110 and the second STA 1120 can be avoided.

For another example, the AP 1150 may allocate a first time resource 1170 to the first STA 1110, and may allocate a second time resource 1180 to the second STA 1120. By using this method, the second STA 1120 and the first STA 1110 which is a hidden node for the second STA 1120 may not operate in the same time resource, and a collision between frames transmitted respectively by the first STA 1110 and the second STA 1120 can be avoided.

Specifically, the first time resource 1170 and the second time resource 1180 may be distinguished with respect to a transmission duration of a beacon frame.

Figure 12:
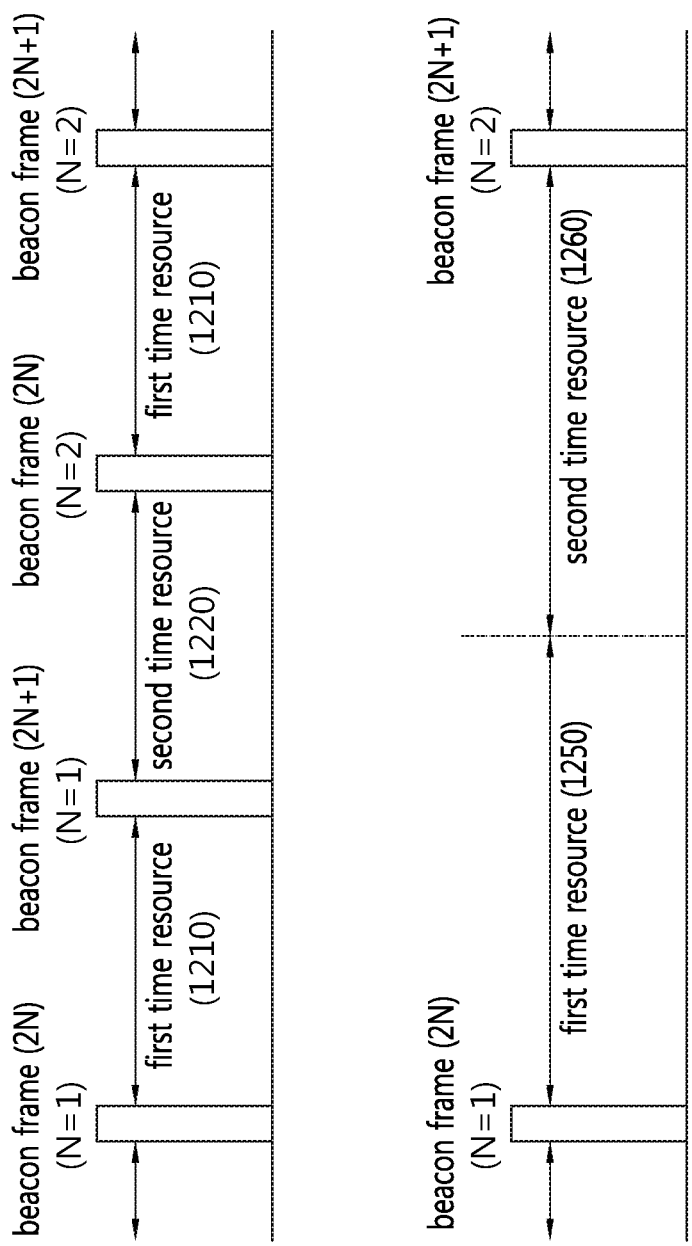
FIG. 12 shows the concept of a time resource allocated to an STA and a hidden node according to an embodiment of the present invention.

FIG. 12 shows the concept of a time resource allocated to an STA and a hidden node according to an embodiment of the present invention.

Referring to an upper portion of FIG. 12, a first time resource 1210 may correspond to a period from a time at which a $(2N)^{th}$ beacon frame is transmitted (where N is a natural number) to the STA to a time at which a $(2N+1)^{th}$ beacon frame is transmitted. A second time resource 1220 may correspond to a period from a time at which the (2N+1)th beacon frame is transmitted to the STA to a time at which a (2N+2)th beacon frame is transmitted. That is, the first time resource 1210 may correspond to a period from a time at which a beacon frame of an even number index is transmitted to a time at which a beacon frame of an odd number index is transmitted, and the second time resource 1220 may correspond to a period from a time at which the beacon frame of the odd number index is transmitted to a time at which the beacon frame of the even number index is transmitted.

Referring to a lower portion of FIG. 12, a first time resource 1250 may be a precedent time resource duration among time resources corresponding to a transmission duration of a beacon frame which is split by half. A second time resource 1260 may be the remaining time resource durations among the time resources corresponding to the beacon frame which is split by half.

Figure 13:
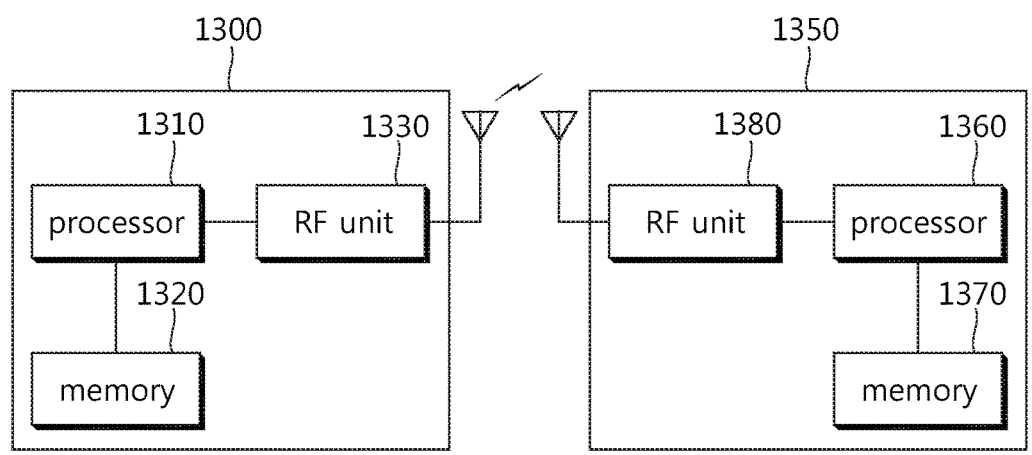
FIG. 13 is a block diagram illustrating a wireless device to which an embodiment of the present invention may apply.

FIG. 13 is a block diagram illustrating a wireless device to which an embodiment of the present invention may apply.

Referring to FIG. 13, the wireless device may be an STA that may implement the above-described embodiments, and the wireless device may be an AP 1300 or a non-AP STA (or STA) (1350).

The AP 1300 includes a processor 1310, a memory 1320, and an RF (Radio Frequency) unit 1330.

The RF unit 1330 may be connected with the processor 1620 to transmit/receive radio signals.

The processor 1310 implements functions, processes, and/or methods as proposed herein. For example, the processor 1310 may be implemented to perform the operation of the above-described wireless device according to an embodiment disclosed in FIG. 8 to FIG. 12 of the present invention.

For example, the processor 1310 may analyze a transmission failure cause on the basis of information about a transmission failure frame transmitted from the STA. The AP may control an operation of the STA according to a collision cause between the STAs. For example, if it is determined that the transmission failure of the STA is caused by a hidden node, the AP may determine an access parameter for a channel access of the STA, or may determine a frame transmission resource of the STA.

The STA 1350 includes a processor 1360, a memory 1370, and an RF (Radio Frequency) unit 1380.

The RF unit 1380 may be connected with the processor 1360 to transmit/receive radio signals.

The processor 1360 implements functions, processes, and/or methods as proposed herein. For example, the processor 1360 may be implemented to perform the operation of the above-described wireless device according to an embodiment disclosed in FIG. 8 to FIG. 12 of the present invention.

For example, the processor 1360 may be implemented to generate a retransmission frame and to transmit the retransmission frame to an access point (AP). The retransmission frame may include information about a transmission failure frame, and the information about the transmission failure frame may include timestamp information and duration information. The timestamp information may include information about a transmission start time of the transmission failure frame, and the duration information may include information about a transmission duration of the transmission failure frame.

The processor 1310, 1360 may include an ASIC (Application-Specific Integrated Circuit), other chipset, a logic circuit, a data processing device, and/or a converter that performs conversion between a baseband signal and a radio signal. The memory 1320, 1370 may include a ROM (Read-Only Memory), a RAM (Random Access Memory), a flash memory, a memory card, a storage medium, and/or other storage device. The RF unit 1330, 1380 may include one or more antennas that transmit and/or receive radio signals.

When an embodiment is implemented in software, the above-described schemes may be embodied in modules (processes, or functions, etc.) performing the above-described functions. The modules may be stored in the memory 1320, 1370 and may be executed by the processor 1310, 1360. The memory 1320, 1370 may be positioned in or outside the processor 1310, 1360 and may be connected with the processor 1310, 1360 via various well-known means.

What is claimed is:

1. A method of reporting information about a transmission failure frame in a wireless local area network (WLAN), the method comprising:

receiving, by an access point (AP), a first retransmission frame for a first uplink frame transmitted by a first station (STA) from the first STA, wherein the first retransmission frame includes first timestamp information indicating a first transmission start time of the first uplink frame and first duration information indicating a first transmission duration of the first uplink frame;

receiving, by the AP, a second retransmission frame for a second uplink frame transmitted by a second STA from the second STA, wherein the second retransmission frame includes second timestamp information indicating a second transmission start time of the second uplink frame and second duration information indicating a second transmission duration of the second uplink frame;

determining, by the AP, whether the first STA is a hidden node for the second STA based on the first transmission start time and the first transmission duration included in the first retransmission frame and the second transmission start time and the second transmission duration included in the second retransmission frame;

setting differently, by the AP, a first channel access parameter of the first STA for retransmitting the first uplink frame and a second channel access parameter of the second STA for retransmitting the second uplink frame, if the first transmission start time is same as the second transmission start time and if the first transmission duration is overlapped by the second transmission duration;

allocating respectively, by the AP, different uplink transmission resources to the first STA that is determined as the hidden node and the second STA, if the first transmission start time is different from the second transmission start time and if the first transmission duration is overlapped by the second transmission duration, wherein the different uplink transmission resources correspond to a first uplink transmission resource allocated for the first uplink frame to be retransmitted by the first STA and a second uplink transmission resource allocated for the second uplink frame to be retransmitted by the second STA; and changing, by the AP, a first transmission rate of the first STA for retransmitting the first uplink frame and a second transmission rate of the second STA for retransmitting the second uplink frame, if the first transmission start time is different from the second transmission start time and if the first transmission duration is not overlapped by the second transmission duration.

2. The method of claim 1, wherein:

the first uplink frame is determined as the transmission failure frame by the first STA, when a corresponding acknowledgement (ACK) frame is not received from the AP in response to the first uplink frame; and the second uplink frame is determined as the transmission failure frame by the second STA, when a corresponding ACK frame is not received from the AP in response to the second uplink frame.

3. The method of claim 1, wherein:

the first channel access parameter includes information for a first contention window size of the first STA and information for a first arbitration inter frame space (AIFS) size of the first STA; and the second channel access parameter includes information for a second contention window size of the second STA and information for a second AIFS size of the second STA.

4. The method of claim 1, wherein:
the first uplink transmission resource includes at least one of a first time resource or a first channel resource for retransmission of the first uplink frame; and
the second uplink transmission resource includes at least one of a second time resource or a second channel resource for retransmission of the second uplink frame.

\* \* \* \* \*